United States Patent [19]

Thomason

[11] Patent Number: 4,649,370
[45] Date of Patent: Mar. 10, 1987

[54] BRAKE CONDITION INDICATOR

[76] Inventor: Linda R. Thomason, 2744 W. Hillside Ave., Denver, Colo. 80219

[21] Appl. No.: 621,165

[22] Filed: Jun. 15, 1984

[51] Int. Cl.⁴ ............................................. B60Q 1/00
[52] U.S. Cl. ................................. 340/52 B; 188/1.11; 339/28
[58] Field of Search ...................... 340/52 A, 52 B, 57, 340/584, 590, 595; 188/1.11; 339/28, 223 R

[56] References Cited

U.S. PATENT DOCUMENTS 1,957,051  5/1934  Norton ................................... 340/57
3,010,184  11/1961  Forney, Jr. ...................... 339/223 R
3,674,114  7/1972  Howard ............................. 340/52 A
3,689,880  9/1972  McKee et al. .................. 188/1.11 X

FOREIGN PATENT DOCUMENTS 2909247  9/1980  Fed. Rep. of Germany ..... 188/1.11
2030635  4/1980  United Kingdom ............... 188/1.11

Primary Examiner—James L. Rowland
Assistant Examiner—Thomas J. Mullen, Jr.

[57] ABSTRACT

A brake condition indicator attachable to a conventional brake shoe comprising a thermocouple carried at one end by a tubular member crimped around the thermocouple and at its extremity, a hollow dimensioned rivet securing the crimped extremity of the tubing to a brake shoe without damage to the shoe itself, said thermocouple connected at the other end to a grounded temperature gauge whereby the heat generated within the brake shoe may be visually displayed to the driver of the vehicle to provide a warning in the event of overheating the brake shoe.

17 Claims, 8 Drawing Figures

FIG. 4
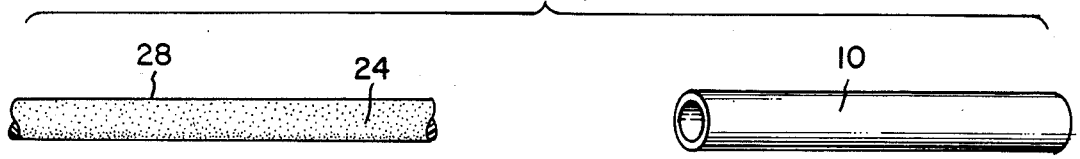
FIG. 5
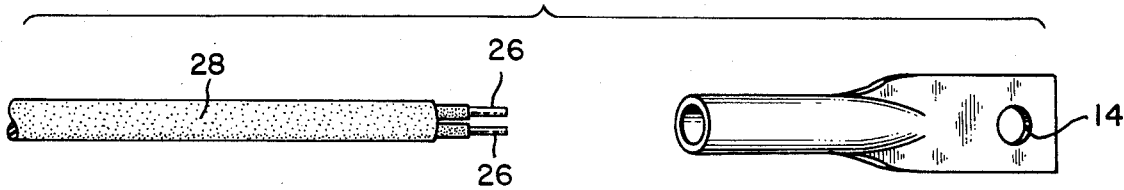
FIG. 6
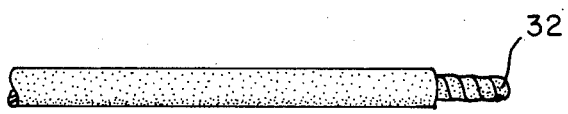
FIG. 7
FIG. 8
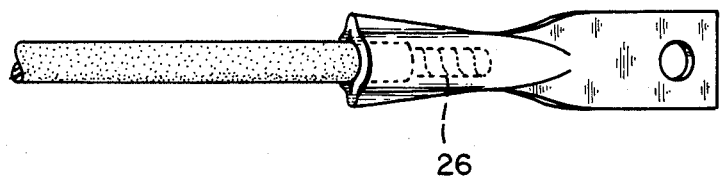

BRAKE CONDITION INDICATOR

BACKGROUND OF THE INVENTION

This invention relates to a brake condition indicator, and more particularly, to means for providing a visual warning to the driver of the vehicle when the brake system in that vehicle is in danger of becoming inoperative due to overheating, excessive use, or the like.

Heretofore, devices have been proposed which provide structure for indicating abnormalities in the operation of brakes in trains and other vehicles. In fact, patents have issued on such suggestions including U.S. Pat. No. 1,907,540 for a temperature indicator applied to railway cars. In addition, Pat. No. 1,957,051 suggests a brake temperature indicator for vehicles, and U.S. Pat. No. 3,975,706 provides an abnormality detector device in a brake system. Also, U.S. Pat. Nos. 2,494,269, 3,321,045, 3,689,880, 3,634,840, and 3,510,835 disclose sensing devices to indicate the condition of brakes on vehicles. However, the structure suggested by these patents of the prior art are quite complex and require that the brake system in the vehicle be modified during construction of the vehicle in order to accommodate the sensing means. There is no suggestion of the utilization of standard, conventional brake systems with such devices, but instead specially built constructions are required. For example, U.S. Pat. No. 1,957,051 discloses thermo elements fitted within a bushing which is secured to the brake shoe. The bushing operates in a slot in a briefing plate. U.S. Pat. No. 3,975,706 provides such a complex system incorporating casings of phenolic resin provided with pick-up coils having a magnetic core which is permanently attached to the system during its manufacture. The other patents mentioned above embody concepts which are expensive and complicated and which are also specially built during the manufacture of the vehicle. Conventional brake arrangements must therefore be modified with the consequent great expense in production, repair, and replacement. Furthermore, the conventional brake shoe is produced of asbestos or similar material and attempts to secure the head detecting devices thereto have been unsuccessful in that the slightest ingression by conventional sharp edged instruments will split, fracture, or otherwise cause damage to the brake shoe itself.

SUMMARY OF THE INVENTION

The invention provides a solution to the foregoing problems utilizing a relatively simple structure which may be secured to a conventional brake shoe without causing any damage thereto, while accurately reflecting any temperature change occurring in the brake shoe.

To accomplish this result, the invention provides a unique and novel thermocouple structure in which a teflon insulated type K thermocouple wire with its ends stripped and joined to form a connecting junction is inserted into a metal tube, preferably of soft brass with thin walls. One end of the tubing has been flattened and provided with a hole therethrough. The thermocouple wire is inserted into the other end of the tubing and the tubing is then crimped around the thermocouple wire. A thermally insulating silicone based heat transfer compound may be placed within the tubing prior to the insertion of the thermocouple wire to facilitate the appropriate head measuring function of the device.

A hollow rivet is then driven through the hole in the flattened portion of the tubing into the brake shoe. The rivet is of conductive metal and is relatively sharp edged to facilitate its movement into the brake shoe material, which is usually of asbestos or the like. The rivet is of metal and is so dimensioned that it will only displace the brake shoe material causing it to move into the hollow portion of the rivet without cracking or otherwise damaging the material in any way.

The other end of the thermocouple wire is connected to a heat sensing gauge, such as a pyrometer gauge, which is located at a point remote from the shoe, as for example, on the dashboard of the vehicle. The pyrometer gauge will operate to indicate the presence of abnormal heat in the brake shoe. This indication is accomplished by the passage of heat from the brake shoe through the rivet to the crimped portion of the tubing. Thereafter, such heat is transmitted to the thermocouple wire and thence to the pyrometer gauge.

The passage of the heat from one element to another is accomplished with accuracy and sufficiently quick action to indicate the danger of overheating to the driver while being sufficiently delayed during the transmission period to prevent any "false alarms".

The following description taken in conjunction with the drawings is to facilitate an understanding of the invention and is not to be construed as a limitation upon the scope thereof.

BRIEF DESCRIPTION OF THE INVENTION

FIG. 4 is a side view of the thermocouple wire and the thin brass tubing before it is flattened.

FIG. 5 is a side view of the thermocouple wire with the insulation stripped from the wires at one end and of the tubing flattened at one end and provided with a hole therethrough.

FIG. 6 is a side view of the thermocouple wires joined together.

FIG. 7 is a side view of the wires provided with an outer sheath of insulating material.

FIG. 8 is a side view of the wires inserted in one end of the tubing with the tubing crimped around the end of the wires.

DETAILED DESCRIPTION OF THE INVENTION

Figure 1:
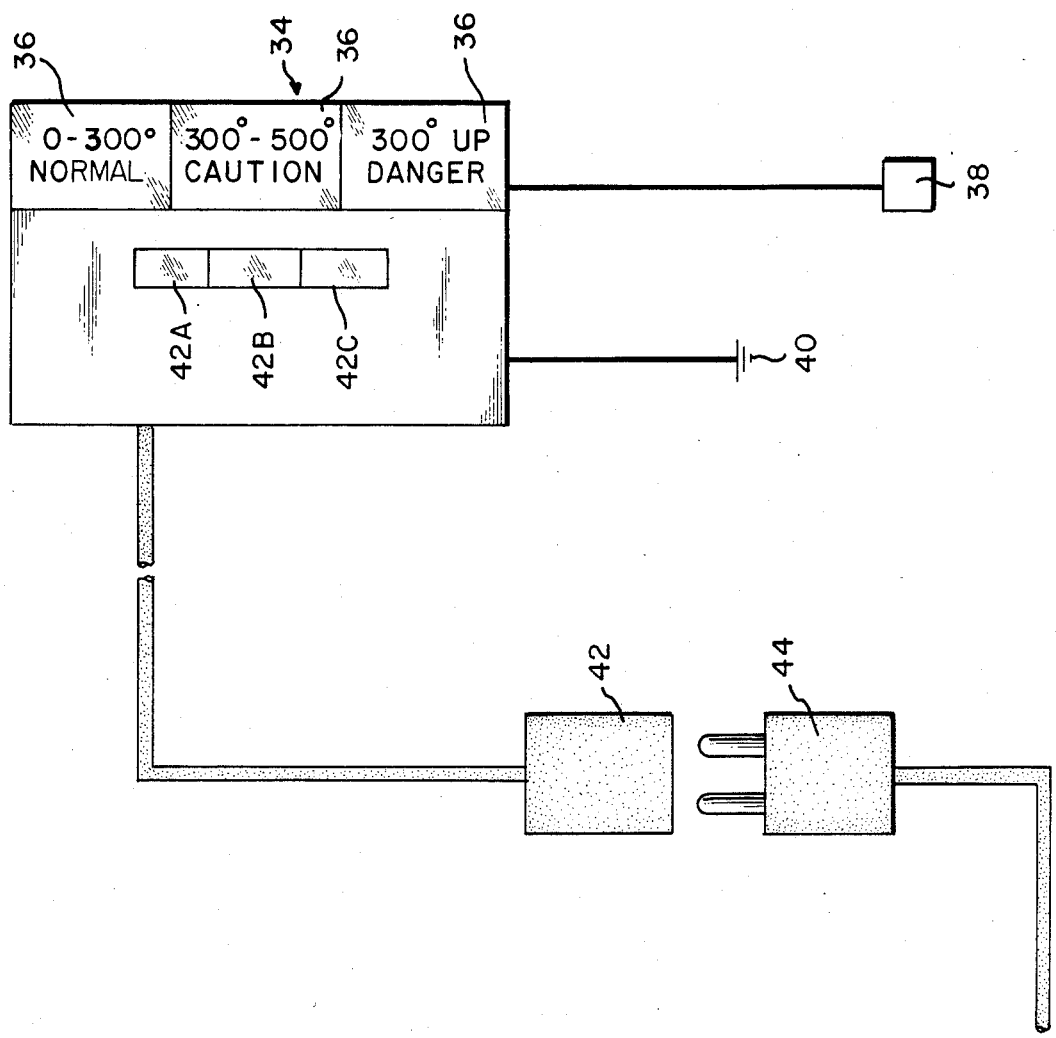
FIG. 1 is a block diagrammatic view of the brake condition indicator system.
Figure 3:
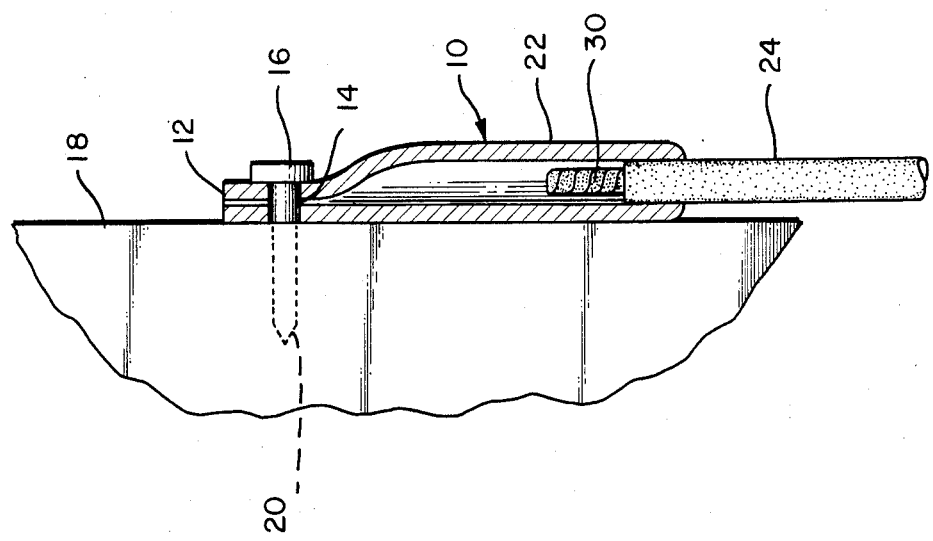
FIG. 3 is a sectional view taken along the longitudinal axis of the tubing illustrated in FIG. 2.
Figure 2:
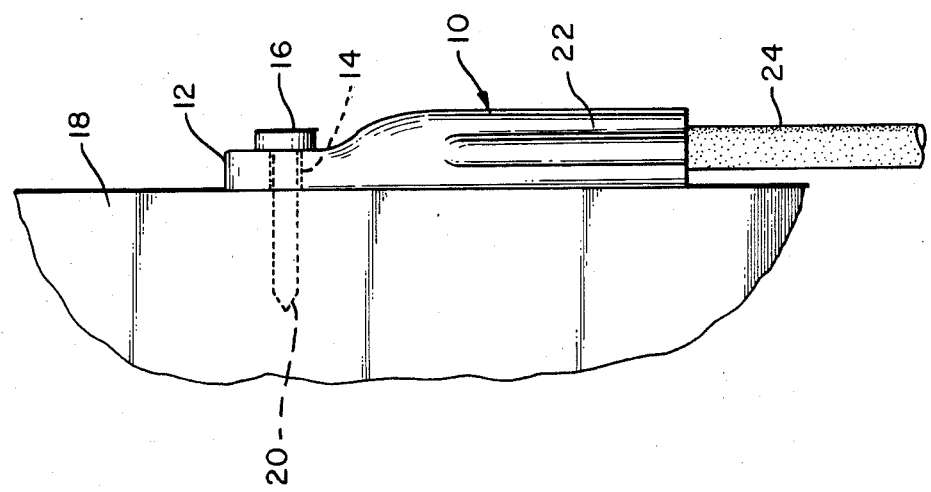
FIG. 2 is a top view of the crimped and flattened tubing carrying the thermocouple wire with the rivet in position in the brake shoe.

As shown in the drawings, the brake condition indicator of the present invention comprises a metal, thin walled, tubing to preferably be made of brass. One end 12 of the tubing is flattened and this flattened end has a hole 14 therethrough a hollow rivet 16 with a flat head passes the hole and into the brake shoe 18. The wall of the rivet is preferably between 12 gauge and 16 gauge thick. The entire rivet is of metal conductive material and preferably of stainless steel. The edge 20 of the rivet is sharp to facilitate its entry into the brake shoe 18. The length of the rivet is between 3/16 to ½ inch.

In accordance with this invention, the hollow rivet 16 has an inner diameter of between 0.0666 to 0.0865, and an outer diameter of between 0.0820 and 0.0840.

The rivet 16, according to the present invention, is so dimensioned as to enable it to penetrate into the brake shoe without cracking or in any way causing damage to the shoe. In fact, the material of the brake shoe is merely displaced and portions, in effect, flow into the hollow portion of the rivet. The flat head of the rivet is in intimate and conductive contact with the flattened end of the tubing 10.

The other end 22 of the tubing 10 is crimped around a thermocouple wire 24. The ends 26 of the wire have been stripped of the insulation 28 and the wires have been joined into a junction 30 prior to their insertion into the end 22 of the tubing 10 and prior to the crimping of the tubing at that end. The wire is prefrably at type K thermocouple wire and after the junction 30 is formed insulating material may be wrapped around the joined ends, if desired. A silicone based thermally insulating heat transfer compound such as that sold under the trademark "Dow 340" may be utilized in the tubing if desired.

The wire 28 extends from the crimpled end 22 of the tubing 10 to a pyrometer gauge 34 having markings 36 to visibly indicate the temperature condition of the brake shoe. The pyrometer gauge is connected to a power source 38, as for example, the car battery or an independent battery and to ground 40. A male and female plug arrangement 42 and 44, to which the thermocouple wires are attached, may be disposed intermediate the crimped end 2 of the tubing 10 and the pyrometer gauge 36. Such construction will enable service, if required, at either end of the brake shoe indicator without disturbing the other end.

The operation of this novel and unique brake shoe indicator is as follows: The heat from the brake shoe 18 is transmitted to the heat conductive flattened head of the rivet 20 through that portion of the rivet which is embedded in the brake shoe 18. This heat passes from the head of the rivet to the flattened portion 12 of the tubing 10 and thence to the crimped end 22. The flattened portion of the tubing also picks up heat directly off the brake block and transmits the heat.

The heat is then transmitted to the junction of the wires 30, which may, as aforesaid, be provided with insulation 32. The heat is generated in the wire as then indicated in the pyrometer gauge 34. When overheating occurs, the digital readout in the pyrometer gauge 34 will indicate this heat by its indicating the temperature by lighting the area 42A, 42B or 42C for providing the temperature indicated in the readout which shows the heat condition of the brake shoe. The short delay occurring in transmitting the heat from the brake shoe to the pyrometer gauge, which may amount to 5 to 10 seconds, prevents any "false alarms", and yet provides a warning to the driver when an overheating condition exists in the brake system. The pryrometer is a conventional pyrometer gauge, utilized in combination with the novel and unique structure heretofore described.

Thus, the present invention provides a totally accurate display of the condition of the brake shoe through the inventive structure set forth herin.

A dab of hi-temperature silicon rubber may be placed, if desired, over flattened brass and rivet head to prevent the influence of temperatures, water on highway, atmospheric temperatures, etc. From outside the device, with this added, the temperature is a few degrees higher than a buried thermocouple wire because the silicon holds heat next to the sensor and is an added safety factor.

While the invention has been described in great detail, it will be understood that this is merely to facilitate an understanding thereof, and that variations and modifications may be made without departing from the spirit of the invention as defined in the appended claims.

I claim:

1. A temperature indicator adapted for use with a brake system including a brake drum or rotor and a brake shoe having a backing plate and a friction lining mounted on the backing plate, the friction lining material possessing a first surface for selective frictional engagement with the brake drum or rotor, a second surface for interfacing engagement with the backing plate, and a third surface, said temperature indicator comprising:
   heat conductive means for penetrating into the third surface of the friction lining without damaging or modifying the structure of the brake shoe to create intimate and direct heat conductive contact with the friction lining;
   a conductive metal member engaging said heat conductive means, said heat conductive means attaching said metal member to the third surface;
   thermocouple wire engaging said metal member at one end of said wire; and
   a pyrometer gauge engaging said thermocouple wire at the other end of said wire.

2. A temperature indicator according to claim 1 wherein said heat conductive means comprises a substantially hollow rivet.

3. A temperature indicator according to claim 2 wherein the thickness of the wall of said rivet is in the range of substantially twelve gauge to sixteen gauge.

4. A temperature indicator according to claim 2 wherein the internal diameter of said rivet is in the range of substantially 0.0666 to 0.0865 inches.

5. A temperature indicator according to claim 2 wherein said rivet is adapted to penetrate the friction lining such that the material compromising the friction lining both substantially surrounds and directly contacts said rivet and substantially fills the interior, hollow portion of said rivet.

6. A temperature indicator according to claim 2 wherein the length of said rivet is within the range of substantially 3/16 to ½ inch.

7. A temperature indicator according to claim 2 wherein said metal member comprises a tube, one end of said tube being crimped around said thermocouple wire and the other end of said tube being flattened, the flattened tube end being provided with an aperture adapted for accommodating the head of said rivet.

8. A temperature indicator according to claim 7 further comprising a silicon based thermally insulating heat transfer compound disposed in said tubing.

9. A temperature indicator according to claim 1 wherein said heat conductor means is reusable without modification after the friction lining has substantially overheated.

10. A temperature indicator according to claim 1 wherein said metal member is disposed in substantially interfacing engagement with the third surface.

11. A temperature indicator adapted for use with a brake system including a friction lining, said temperature indicator comprising:
   a substantially hollow rivet adapted to be driven into, to penetrate, and to be embedded in the friction lining without damaging or modifying the structure of the frictional lining to create intimate and direct heat conductive contact with the friction lining;

means for monitoring the temperature of said rivet; and means responsive to said monitoring means for providing a warning when the friction lining has substantially overheated.

12. A temperature indicator according to claim 11 wherein the thickness of the wall of said rivet is in the range of substantially twelve gauge to sixteen gauge.

13. A temperature indicator according to claim 11 wherein the internal diameter of said rivet is in the range of substantially 0.0666 to 0.0865 inches.

14. A temperature indicator according to claim 11 wherein the length of said rivet is within the range of substantially 3/16 to ½ inch.

15. A temperature indicator according to claim 11 wherein said rivet is adapted to be driven into, to penetrate, and to be embedded in the friction lining such that the material comprising the friction lining both substantially surrounds and directly contacts said rivet and substantially fills the interior, hollow portion of said rivet.

16. A temperature indicator according to claim 11 wherein said rivet is reusable without modification after the friction lining has substantially overheated.

17. A temperature indicator according to claim 11 further including a heat conductive body attached by said rivet to said friction lining, said rivet being in substantially intimate and heat conductive contact with said heat conductive body and said heat conductive body being in substantially interfacing engagement with said friction lining, and wherein said monitoring means comprises a thermocouple operatively engaging said heat conductive body.

* * * * *